United States Patent
Goodwin et al.

(10) Patent No.: US 9,365,462 B2
(45) Date of Patent: Jun. 14, 2016

(54) PHOSPHATE MAGNESIUM ZINC FERTILIZER

(71) Applicant: COMPASS MINERALS MANITOBA, INC., Winnipeg (CA)

(72) Inventors: Mark Goodwin, Winnipeg (CA); Kerry Green, Winnipeg (CA)

(73) Assignee: COMPASS MINERALS MANITOBA, INC., Winnipeg (CA)

( * ) Notice: Subject to any disclaimer, the term of this patent is extended or adjusted under 35 U.S.C. 154(b) by 58 days.

(21) Appl. No.: 14/332,021

(22) Filed: Jul. 15, 2014

(65) Prior Publication Data

US 2015/0027042 A1    Jan. 29, 2015

Related U.S. Application Data

(60) Provisional application No. 61/857,336, filed on Jul. 23, 2013.

(51) Int. Cl.
| | |
|---|---|
| C05G 1/00 | (2006.01) |
| A01C 1/06 | (2006.01) |
| C05B 17/02 | (2006.01) |
| C05B 17/00 | (2006.01) |
| A01G 1/00 | (2006.01) |
| C05B 7/00 | (2006.01) |
| C05G 3/00 | (2006.01) |

(52) U.S. Cl.
CPC . *C05B 17/00* (2013.01); *A01C 1/06* (2013.01); *A01G 1/001* (2013.01); *C05B 7/00* (2013.01); *C05B 17/02* (2013.01); *C05G 1/00* (2013.01); *C05G 3/007* (2013.01); *C05G 3/0041* (2013.01)

(58) Field of Classification Search
CPC ............. C05G 1/00; A01C 1/06; C05B 17/02
USPC ..................... 71/33, 64.07; 47/57.5
See application file for complete search history.

(56) References Cited

U.S. PATENT DOCUMENTS

| | | | |
|---|---|---|---|
| 5,549,729 A | 8/1996 | Yamashita | |
| 2003/0022790 A1* | 1/2003 | Hero | A01C 1/06 504/100 |
| 2010/0267554 A1* | 10/2010 | Madsen | A01C 1/06 504/100 |

FOREIGN PATENT DOCUMENTS

| | | |
|---|---|---|
| CA | 2216735 | 10/1996 |
| CA | 2751373 | 8/2010 |

(Continued)

OTHER PUBLICATIONS

Shaygany et al., "Increased yield of direct seeded rice (*Oryza sativa* L.) by foliar fertilization through multi-component fertilizers", Archives of Agronomy and Soil Science, vol. 58, No. 10, 1091-1098. Oct. 31, 2012.

Xu et al., "Sulfur and Boron—Magnesium—Zinc Compound Fertilizer Contribute to the Reproductive Growth of *Jatropha Curcas* L.", Journal of Plant Nutrition, 34: 1843-1852. Dec. 31, 2011.

(Continued)

*Primary Examiner* — Wayne Langel
(74) *Attorney, Agent, or Firm* — McKee, Voorhees & Sease, PLC.

(57) ABSTRACT

A fertilizer product for delivering starter fertilizer to crops in soils as an alternative to traditional phosphorus applications to enhance rapid early plant development. Specifically, the fertilizer product comprises a synergistic mixture of:

from about 0.5 to about 1 part Mg: from about 2.4 to about 2.8 parts $P_2O_5$: from about 1.4 to about 2.8 parts Zn.

40 Claims, 1 Drawing Sheet

(56) References Cited

FOREIGN PATENT DOCUMENTS

| CA | 2804600 | | 4/2012 | |
| CN | 1188754 | * | 1/1997 | ............... C05G 1/00 |
| EP | 1612200 | | 1/2006 | |
| WO | 2007126388 | | 11/2007 | |

OTHER PUBLICATIONS

Wolf Trax Inc., PCT/CA2014/050690 filed Jul. 22, 2014, "The International Search Report and The Written Opinion of the International Searching Authority, or the Declaration", mailed Oct. 31, 2014.

* cited by examiner

PHOSPHATE MAGNESIUM ZINC FERTILIZER

CROSS REFERENCE TO RELATED APPLICATIONS

This application claims priority under 35 U.S.C. §119(e) to provisional application U.S. Ser. No. 61/857,336, filed Jul. 23, 2013, herein incorporated by reference in its entirety.

FIELD OF THE INVENTION

The present invention relates generally to the field of fertilizers.

BACKGROUND OF THE INVENTION

Starter fertilizer is defined as the small quantity of fertilizer nutrients applied in close proximity to the seed at planting by growers of crops. In some instances, the practice entails placing the fertilizer into the seed row directly with the seed and this is often referred to as a "pop up" fertilizer. Growers of crops use starter fertilizers to enhance the development of emerging seedlings by supplying essential nutrients in accessible locations near the roots. This is especially important when crops are planted into cold, wet soils and/or when seeding into minimum tillage situations.

Phosphorus is routinely used in starter fertilizers/pop up applications. However, phosphorus is immobile in the soil and subsequently small seedling roots have difficulty obtaining the necessary amounts for rapid growth. For these reasons, phosphorus is routinely used as a starter/pop up fertilizer, even when overall phosphorus levels in a field may be adequate or high. For example, recommendations call for 35 kg $P_2O_5$ per hectare. However, phosphate in the soil can interact with other nutrients and immobilize them.

Furthermore, there are obvious environmental concerns regarding high soil phosphate levels leaching into the environment as well as potential toxicity to seeds and plants. As one skilled in the art knows, $P_2O_5$ is an industry term, used to refer to a source of phosphate.

In certain situations, zinc also may be used by growers as a component of a starter fertilizer. Like phosphorus, zinc is highly immobile in soil. In situations where soil tests indicate that zinc levels are inadequate or marginal, growers will often use zinc as a component of a starter as well.

Magnesium is not commonly considered as a starter fertilizer and consequently is typically not used as a component of a starter fertilizer. Rather, it is usually added as a secondary nutrient or alternatively as a portion of a liming program (Dolomitic lime).

Work in western Iran and published in the Journal of Soil and Sediment (Khanlari, Z. V. and Jalali, M, 2011; "*The effect of sodium and magnesium on kinetics of phosphorus release in some calcareous soils of western Iran*", Soil and sediment: An International Journal 20:4, 411-431) looked at the impact of magnesium and calcium ions in irrigation water on the availability of phosphorus in soils in Iran. The researchers noted that irrigation water that had a high calcium level relative to magnesium was detrimental to levels of available soil-P relative to the reverse situation (high Mg and low Ca) which was "friendly" to soil status with respect to high available P. However, this paper focuses solely on irrigation water and does not teach or suggest the potential for inventing a product that manipulated magnesium levels as a component of a synergistic approach to phosphorus fertilizer dynamics.

Work at Brigham Young University in 2011 attempted to characterize the interaction between zinc and phosphorus fertilizer (but not magnesium) and this work found that "when varying both P and Zn, increasing Zn levels stimulated P uptake when ample P was present in the soil—but this did not occur when P was deficient. (Brandt, A, B Hopkins, V Jolley, B Webb, B greenwood and J Buck, 2012:" *Phosphorus and zinc interactions and their relationships with other nutrients in maize grown in chelator buffered nutrient solution, J Plant Nutrition* 35:1, 123-141).

Thus, it has been demonstrated that water with low magnesium and high calcium was detrimental to uptake of soil-available phosphate while low calcium, high magnesium water was not detrimental.

Furthermore, it was established that zinc stimulated phosphate uptake when phosphate was present in excess but not when phosphate was deficient.

SUMMARY OF THE INVENTION

According to an aspect of the invention, there is provided a fertilizer product comprising: from about 0.5 to about 1 part Mg: from about 2.4 to about 2.8 parts $P_2O_5$: from about 1.4 to about 2.8 parts Zn.

As discussed herein, the fertilizer product may be (a) a fine powder mixture, (b) a granular mixture or (c) a liquid solution or suspension. In some embodiments, the fertilizer product is formulated for application to an agronomic product or carrier.

The agronomic carrier may be selected from the group consisting of: an inert carrier, a biodegradable carrier, a fertilizer product or prill, a soil amending product, and a seed.

In those embodiments in which the fertilizer product is a fine powder mixture or a granular mixture, the Mg, $P_2O_5$ and Zn may be mixed together in a dry mill grinder.

In those embodiments in which the fertilizer product is a fine mixture, the fine mixture may be ground to a fine mesh size of at least through a 100 mesh, U.S. standard sieve or at least through a 325 mesh, U.S. standard sieve and then applied directly to a dry agronomic product.

The fine powder mixture may be applied at from about 0.1% to about 2.5% (w/w) of the agronomic product. Alternatively, the mixture may be applied at from about 0.3% to about 2.5% (w/w) of the agronomic product, or from about 0.1% to about 2.0% (w/w) of the agronomic product or from about 0.3% to about 2.0% (w/w) of the agronomic product or from about 0.3% to about 1.5% (w/w) of the agronomic product.

The zinc in the fertilizer product may be zinc oxide, zinc sulphate or a mixture thereof.

The $P_2O_5$, i.e., phosphate, in the fertilizer product may be sourced from low pH monoammonium phosphate, diammonium phosphate or rock phosphate, but is preferably from monoammonium phosphate, which has a pH for example of 4-5.9.

The magnesium in the fertilizer product may be magnesium carbonate, magnesium oxide, magnesium sulphate or mixtures thereof.

According to a further aspect of the invention, there is provided a method of preparing a coated agronomic product for use as a pop-up fertilizer comprising:

coating an agronomic carrier with from about 0.1% to about 2.5% (w/w) of a fine powder comprising from about 0.5 to about 1 part Mg: from about 2.4 to about 2.8 parts $P_2O_5$: from about 1.4 to about 2.8 parts Zn.

Alternatively, the mixture may be applied at from about 0.3% to about 2.5% (w/w) of the agronomic product, or from about 0.1% to about 2.0% (w/w) of the agronomic product or from about 0.3% to about 2.0% (w/w) of the agronomic product or from about 0.3% to about 1.5% (w/w) of the agronomic product.

According to a further aspect of the invention, there is provided a method of promoting improved early growth in a plant comprising:

coating an agronomic product with from about 0.1% to about 2.5% (w/w) of a fine powder comprising from about 0.5 to about 1 part Mg: from about 2.4 to about 2.8 parts $P_2O_5$: from about 1.4 to about 2.8 parts Zn;

applying said coated agronomic product to a region of soil suitable for planting of a seed or seedling;

allowing said seed or seedling to grow; and recovering the plant, wherein said plant will have improved growth characteristics over a comparable plant of similar variety grown under similar conditions but in the absence of the fine powder.

Alternatively, the mixture may be applied at from about 0.3% to about 2.5% (w/w) of the agronomic product, or from about 0.1% to about 2.0% (w/w) of the agronomic product or from about 0.3% to about 2.0% (w/w) of the agronomic product or from about 0.3% to about 1.5% (w/w) of the agronomic product.

DETAILED DESCRIPTION OF THE PREFERRED EMBODIMENTS

Figure 1:
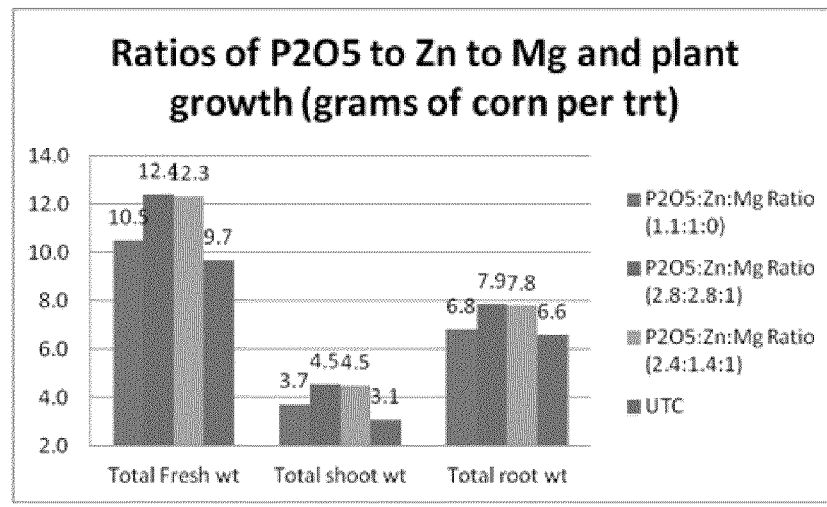
FIG. 1 shows the ratios of $P_2O_5$ to Zn to Mg and their effect on plant growth (grams of corn per treatment).

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

Described herein is a unique fertilizer product for delivering starter fertilizer to crops in soils as an alternative to traditional phosphorus applications to enhance rapid early plant development.

As discussed herein, the fertilizer product may be formulated as (a) a fine powder mixture, (b) a granular mixture or (c) a liquid solution or suspension. In some embodiments, the fertilizer product is formulated for application to an agronomic product or carrier. For example, the fine powder mixture may be applied directly to a suitable agronomic product prior to applying the coated agronomic product to the soil. The granular mixture may be co-applied during seeding, as discussed herein. The liquid solution or suspension may be co-applied during seeding or the liquid solution or suspension may be applied either directly to a suitable agronomic carrier or in combination with a suitable binder or adhesive agent.

As discussed above, it has been demonstrated that calcium can impair utilization of phosphate in soil and it was also demonstrated that zinc can promote phosphate uptake when soil phosphate is high. However, in no case does the prior art refer to the benefits that would arise from using a combination of phosphorus/zinc/magnesium as a starter fertilizer or as an in-seed-row "pop up" fertilizer. Specifically, nowhere in the literature has a specific synergy between $P_2O_5$, Zn and Mg been described. As described herein, when these elements are applied in concert at a specific range of ratios, for example, onto an agronomic carrier as a liquid solution or suspension or in finely divided particles, or co-applied in seed row during seeding, considerable improvement in growth is seen, particularly in the roots and shoots of the plants. As discussed below, the criticality of these ratios is clearly demonstrated in FIGS. 1 and 2.

That is, while not wishing to be bound to a particular theory or hypothesis, it is believed that phosphate can induce zinc deficiency and that supplying a plant with phosphate only would induce a zinc deficiency in that plant, thereby reducing growth rate and growth efficiency. Similarly, zinc can induce a phosphate deficiency. Furthermore, magnesium, zinc and phosphate are all required during early stages of growth and accordingly, supplying all three in synergistic amounts as done here promotes improved growth, as discussed herein.

In one embodiment of the invention, there is provided a fertilizer product comprising:

The applicant has discovered that by manipulating and refining sources of three elements (Mg, P and Zn) it is possible to attain substantial increases in early plant growth. This occurs only when the following three conditions are met: (a) they must be applied together in a homogeneous mix, (b) they must be applied in a specific range of ratios and (c) they must be applied as powders coated upon conventional granular or prilled fertilizer or alternatively onto seed.

Phosphate can induce zinc deficiency and that supplying a plant with phosphate only would induce a zinc deficiency in that plant, thereby reducing growth rate and growth efficiency. Similarly, zinc can induce a phosphate deficiency. Furthermore, magnesium, zinc and phosphate are all required during early stages of growth and accordingly, supplying all three in synergistic amounts promotes improved growth.

The combination of ingredients used herein when applied in the specific manner described—results in creation of conditions that maximize positive conditions in the soil at the same time as they synergize plant growth characteristics. While not wishing to be bound by theory, the mode of action likely begins with the powdered Mg creating a positive micro environment for the co-formulated P by counterbalancing any negative impacts from ambient Ca ions. This initial step sets up the three-part formula for enhanced uptake of all three elements. Once taken up, the Mg helps drive photosynthesis, and the Zn and the P drive root growth to a level of early plant growth that only typically would be seen using tens of pounds of early season phosphate fertilizers.

From about 0.5 to about 1 part Mg: from about 2.4 to about 2.8 parts $P_2O_5$: from about 1.4 to about 2.8 parts Zn.

The fertilizer product may be applied to the outer surface of an agronomic product. For example, the agronomic product may be any suitable coat-able agricultural agent, that is, anything applied to the soil, for example, an inert carrier, a biodegradable carrier, a fertilizer product, a fertilizer prill, a fertilizer granule, a soil amending product, or a seed.

Alternatively, as discussed above, the fertilizer product in the form of a granular mixture or of a liquid solution or suspension may be co-applied in the seed row during the seeding process.

In a preferred embodiment, the components of the fertilizer product are mixed together in a dry mill grinder, is ground to a fine mesh size of at least through a 100 mesh or at least through a 325 mesh U.S. standard sieve and then applied directly to a dry agronomic product. It is of note that the dry powder is applied directly to the agronomic product without the use of a binder solution or adhesive solution.

In some embodiments, the fine powder mixture is applied at from about 0.1% to about 2.5% (w/w) of the agronomic product. In alternative embodiments, the powder mixture is applied at from about 0.1% to about 2.0% or from about 0.1% to about 1.5% or from about 0.3% to about 2.5% or from about 0.3% to about 2.0% or from about 0.3% to about 1.5% (w/w) of the agronomic product.

In other embodiments, the fertilizer product is in the form of a liquid suspension or solution and is applied either directly to the agronomic product or is applied subsequent to or in combination with application of a binder solution using means known in the art.

The zinc may be in any suitable format, for example but by no means necessarily limited to, zinc oxide, zinc sulphate or a mixture thereof.

The magnesium may be in any suitable format, for example but by no means necessarily limited to, magnesium carbonate, magnesium oxide, magnesium sulphate or mixtures thereof.

As will be readily apparent to one of skill in the art, the oxide, sulphate and carbonate forms of magnesium and the oxide and sulphate forms of zinc have different uptake rates and consequently by varying the ratios of the different minerals in the fertilizer product, the amount of the specific mineral available to the plants at specific times following seeding can be varied.

The $P_2O_5$ may be in any suitable format, for example, sourced from monoammonium phosphate, diammonium phosphate or rock phosphate. In other embodiments, the $P_2O_5$ may preferably be the low pH form of monoammonium phosphate.

In one embodiment of the invention, there is provided a fertilizer product comprising:

From about 0.5 to about 1 parts magnesium carbonate, magnesium oxide, magnesium sulphate or mixtures thereof;

From about 2.4 to about 2.8 parts monoammonium phosphate; and From about 1.4 to about 2.8 parts zinc oxide, zinc sulphate or a mixture thereof.

According to another aspect of the invention, there is provided a method of preparing a coated agronomic carrier for use as a starter fertilizer comprising:

coating an agronomic carrier with from about 0.1% to about 2.5% (w/w) of a fertilizer product comprising from about 0.5 to about 1 part Mg: from about 2.4 to about 2.8 parts $P_2O_5$: from about 1.4 to about 2.8 parts Zn.

In a preferred embodiment, the mixture is mixed together in a dry mill grinder and is ground to a fine mesh size of at least through a 100 mesh or at least through a 325 mesh and then applied directly to a dry agronomic carrier, as discussed above.

According to a further aspect of the invention, there is provided a method of promoting improved early growth in a plant comprising coating an agronomic product with from about 0.1% to about 2.5% (w/w) of a fertilizer product comprising from about 0.5% to about 1 part Mg: from about 2.4 to about 2.8 parts $P_2O_5$: from about 1.4 to about 2.8 parts Zn; applying said coated agronomic product to a region of soil suitable for planting of a seed or seedling; allowing said seed or seedling to grow; and recovering the plant, wherein said plant will have improved growth characteristics over a comparable plant of similar variety grown under similar conditions but in the absence of the fine powder. For example, the plant will show improved root structure and architecture, for example, more root density, compared to the control plant.

In alternative embodiments, the powder mixture is applied at from about 0.1% to about 2.0% or from about 0.1% to about 1.5% or from about 0.3% to about 2.5% or from about 0.3% to about 2.0% or from about 0.3% to about 1.5% (w/w) of the agronomic product.

It is of note that the fertilizer product or coated agronomic product may be co-administered to the soil with planting of the seed or seedling and that while these may be stated as separate steps herein for ease of comprehension, co-administration is within the scope of the invention. Alternatively, the agronomic product may be a seed coated with the fertilizer product which is planted. As will be appreciated by one of skill in the art, in this case, the seed and the fertilizer product are of course co-administered.

In another aspect of the invention, there is provided a method of improving early growth of a plant comprising providing a plant, seedling or seed a fertilizer product comprising:

from about 0.5 to about 1 part Mg: from about 2.4 to about 2.8 parts $P_2O_5$: from about 1.4 to about 2.8 parts Zn; and growing the plant under suitable growth conditions.

As discussed in the examples, a plant provided the fertilizer product will show improved growth compared to a plant of similar type and age, grown under similar conditions except for the presence of the fertilizer product. For example, the treated plant may have at least a more extensive root structure, greater growth rate and greater plant weight compared to the untreated control plant.

The plant or seedling may be provided the fertilizer product by being grown from a seed coated with the fertilizer product.

EXAMPLES

The invention will now be described by way of examples; however, the invention is not necessarily limited by the examples.

Figure 2:
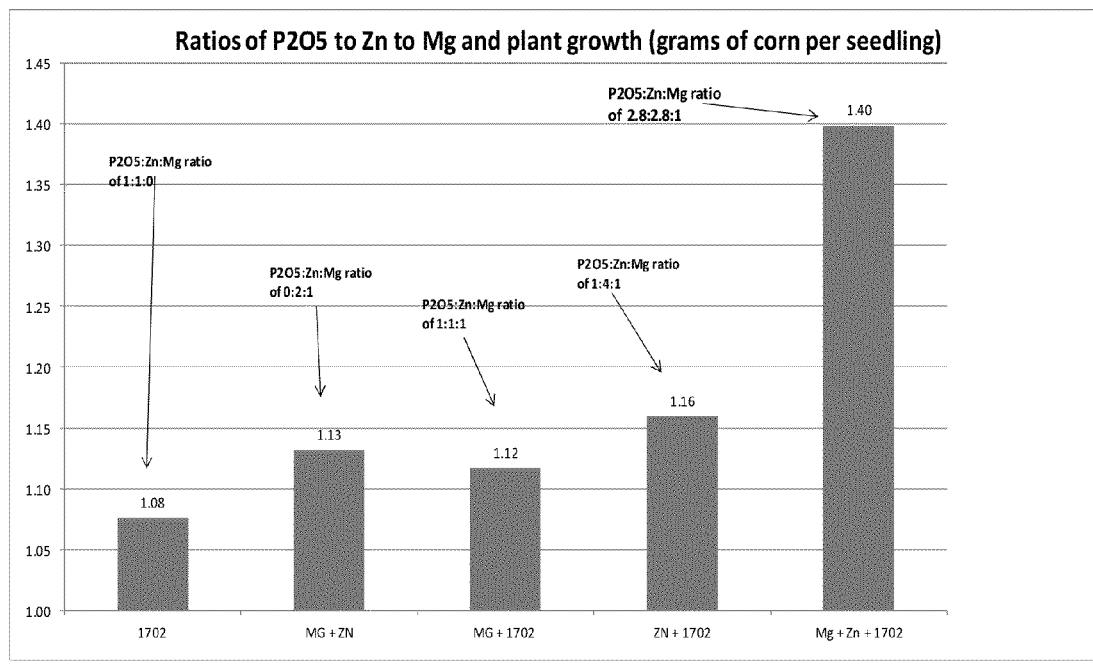
FIG. 2 shows ratios of $P_2O_5$ to Zn to Mg and plant growth (grams of corn per seedling).

FIGS. 1 and 2 describes two ratio experiments that shows the impact on early corn growth when the mixture comprising various ratios of the three elements as discussed herein and as shown in the figures are applied in a fashion wherein they are of a particle size as described above and applied as a coating onto urea prills.

In the experiments, the coating was applied to a urea blend to a level of 0.8% w/w and then broadcast into growth chamber trays. There were three replicates grown under greenhouse lights.

As can be seen in FIG. 1, a mixture of 1 part $P_2O_5$: 1 part zinc: 1 part magnesium produced more shoot weight (3.7 g vs 3.1 g) and slightly more root weight (6.8 vs. 6.6) than an untreated control grown under similar conditions. However, mixtures of 2.8 parts $P_2O_5$: 2.8 parts zinc: 1 part magnesium and 2.4 parts $P_2O_5$: 1.4 parts zinc: 1 part magnesium both produced more substantial increases in root weight (7.9 g and 7.8 g) and shoot weight (4.5 g and 4.5 g) compared to the 1:1:1 ratio (6.8 g and 3.7 g) and especially the untreated control (6.6 g and 3.1 g).

As can be seen in FIG. 2, different mixtures were tested in a manner similar to the experiment shown in FIG. 1.

As can be seen, the mixture of 1 part $P_2O_5$: 1 part zinc but no magnesium (designated hereafter as "1:1:0") had the lowest growth (1.08 g).

Addition of 1 part magnesium (designated hereafter as "1:1:1") resulted in only a slight increase in growth (1.12 g).

Similarly, a mixture of 2 parts zinc, 1 part magnesium and no $P_2O_5$ (designated hereafter as "0:2:1") resulted in slightly improved growth (1.13 g) compared to the 1:1:0 ratio (1.08 g) and the 1:1:1 ratio (1.12 g).

Similarly, a mixture of 1 part $P_2O_5$: 4 parts zinc: 1 part magnesium (designated hereafter as "1:4:1") showed some improvement in growth (1.16 g) compared to the 1:1:1 mixture (1.12 g), the 0:2:1 mixture (1.13 g) and the 1:1:0 mixture (1.08 g).

However, surprisingly, a mixture of 2.8 parts $P_2O_5$: 2.8 parts zinc: 1 part magnesium (hereafter designated as "2.8:2.8:1") showed substantial growth improvement (1.40 g) over the other mixtures, including the 1:4:1 mixture.

While the preferred embodiments of the invention have been described above, it will be recognized and understood that various modifications may be made therein, and the appended claims are intended to cover all such modifications which may fall within the spirit and scope of the invention.

What is claimed:

1. A combination fertilizer product selected from the group consisting of:
    granular fertilizer, prilled fertilizers and seed; and
    applied to it, a homogenous powdered coating mix of magnesium, phosphorous and zinc,
    said mix being from about 0.5 to about 1 part Mg: from about 2.4 to about 2.8 parts P2O5: from about 1.4 to about 2.8 parts Zn.

2. The fertilizer product according to claim 1 wherein the fertilizer product is in a format selected from the group consisting of: a fine powder; a granular powder; a liquid solution; and a liquid suspension.

3. The fertilizer product according to claim 2 wherein the fertilizer product is a fine powder that is ground to a fine mesh size of at least through a 100 mesh, U.S. standard sieve.

4. The fertilizer product according to claim 2 wherein the fertilizer product is a fine powder that is ground to a fine mesh size of at least through a 325 mesh, U.S. standard sieve.

5. The fertilizer product according to claim 1 wherein the zinc is selected from the group consisting of zinc oxide, zinc sulphate and mixtures thereof.

6. The fertilizer product according to claim 1 wherein the P2O5 is from monoammonium phosphate having a pH of 4-5.9.

7. The fertilizer product according to claim 1 wherein the magnesium is selected from the group consisting of magnesium carbonate, magnesium oxide, magnesium sulphate and mixtures thereof.

8. A method of preparing a coated agronomic product comprising:
    coating an agronomic product with from about 0.1% to about 2.5% (w/w) of a fertilizer product comprising from about 0.5 to about 1 part Mg: from about 2.4 to about 2.8 parts P2O5: from about 1.4 to about 2.8 parts Zn.

9. The method according to claim 8 wherein the agronomic product is selected from the group consisting of: an inert carrier, a biodegradable carrier, a fertilizer product, a fertilizer prill, a fertilizer granule, a soil amending product, and a seed.

10. The method according to claim 8 wherein the fertilizer product is a fine powder that is ground to a fine mesh size of at least through a 100 mesh, U.S. standard sieve.

11. The method according to claim 8 wherein the fertilizer product is a fine powder mixture that is ground to a fine mesh size of at least through a 325 mesh, U.S. standard sieve.

12. The method according to claim 11 wherein the fine powder mixture is applied at from about 0.1% to about 2.0% (w/w) of the agronomic carrier.

13. The method according to claim 11 wherein the fine powder mixture is applied at from about 0.3% to about 2.5% (w/w) of the agronomic carrier.

14. The method according to claim 11 wherein the fine powder mixture is applied at from about 0.3% to about 2.0% (w/w) of the agronomic carrier.

15. The method according to claim 11 wherein the zinc is selected from the group consisting of zinc oxide, zinc sulphate and mixtures thereof.

16. The method according to claim 8 wherein the P2O5 is from monoammonium phosphate having a pH of 4-5.9.

17. The method according to claim 8 wherein the magnesium is magnesium carbonate, magnesium oxide, magnesium sulphate or a mixture thereof.

18. The method according to claim 8 wherein the fine powder is applied directly to the agronomic carrier.

19. A method of promoting improved growth in a plant comprising:
    coating an agronomic product with from about 0.1% to about 2.5% (w/w) of a fertilizer product, said fertilizer product comprising from about 0.5 to about 1 part Mg: from about 2.4 to about 2.8 parts P2O5: from about 1.4 to about 2.8 parts Zn;
    applying said coated agronomic product to a region of soil suitable for planting;
    planting a seed or seedling in said soil;
    allowing said seed or seedling to grow; and
    harvesting the plant, wherein said plant has improved growth characteristics over a comparable plant of similar variety grown under similar conditions but in the absence of the fertilizer product.

20. The method according to claim 19 wherein the agronomic product is selected from the group consisting of: an inert carrier, a biodegradable carrier, a fertilizer product, a fertilizer prill, a seed and a soil amending product.

21. The method according to claim 20 wherein the fertilizer product is a fine powder that is ground to a fine mesh size of at least through a 100 mesh, U.S. standard sieve.

22. The method according to claim 19 wherein the fertilizer product is a fine powder mixture that is ground to a fine mesh size of at least through a 325 mesh, U.S. standard sieve.

23. The method according to claim 22 wherein the fine powder mixture is applied at from about 0.1 to about 2.0% (w/w) of the agronomic carrier.

24. The method according to claim 22 wherein the fine powder mixture is applied at from about 0.3% to about 2.0% (w/w) of the agronomic carrier.

25. The method according to claim 22 wherein the fine powder mixture is applied at from about 0.3% to about 1.5% (w/w) of the agronomic carrier.

26. The method according to claim 19 wherein the zinc is selected from the group consisting of zinc oxide, zinc sulphate and mixtures thereof.

27. The method according to claim 19 wherein the P2O5 is from low pH monoammonium phosphate.

28. The method according to claim 19 wherein the magnesium is selected from the group consisting of magnesium carbonate, magnesium oxide, magnesium sulphate and mixtures thereof.

29. The method according to claim 22 wherein the fine powder mixture is applied as a dry powder directly to the agronomic carrier.

30. The method according to claim 19 wherein the agronomic carrier is the seed that is planted in the soil.

31. A method of promoting improved early growth in a plant comprising:
    applying an agronomic product to a seed row, wherein the agronomic product is coated with a fertilizer product comprising: from about 0.5 to about 1 part Mg: from about 2.4 to about 2.8 parts P2O5: from about 1.4 to about 2.8 parts Zn as a powder coating;
    planting a seed or seedling in the seed row;
    allowing said seed or seedling to grow into a plant; and harvesting the plant, wherein said plant has improved growth characteristics over a comparable plant of similar variety grown under similar conditions but in the absence of the fertilizer product powder coating.

32. The method according to claim 31 wherein the zinc is selected from the group consisting of zinc oxide, zinc sulphate and mixtures thereof.

33. The method according to claim 31 wherein the P2O5 is from monoammonium phosphate having a pH of 4-5.9.

34. The method according to claim 31 wherein the magnesium is selected from the group consisting of magnesium carbonate, magnesium oxide, magnesium sulphate and mixtures thereof.

35. The method according to claim 31 wherein the fertilizer product is a fine powder that is ground to a fine mesh size of at least through a 100 mesh.

36. The method according to claim 31 wherein the fertilizer product is a fine powder that is ground to a fine mesh size of at least through a 325 mesh.

37. The method according to claim 35 wherein the agronomic product is coated with from about 0.1% to about 2.0% (w/w) of the fertilizer product.

38. The method according to claim 35 wherein the agronomic product is coated with from about 0.3% to about 2.0% (w/w) of the fertilizer product.

39. The method according to claim 35 wherein the agronomic product is coated with from about 0.3% to about 1.5% (w/w) of the fertilizer product.

40. A method of promoting improved early growth in a plant comprising:

applying a fertilizer product comprising from about 0.5 to about 1 part Mg: from about 2.4 to about 2.8 parts $P_2O_5$: from about 1.4 to about 2.8 parts zinc to a seed as a powder coating;

planting the coated seed in a seed row;

allowing said seed to grow into a plant;

and harvesting the plant, wherein said plant has improved growth characteristics over a comparable plant of similar variety grown under similar conditions but in the absence of the fertilizer product powder coating.

* * * * *